(12) United States Patent
Sceats

(10) Patent No.: US 10,829,413 B2
(45) Date of Patent: Nov. 10, 2020

(54) PROCESS AND APPARATUS FOR MANUFACTURE OF CALCINED COMPOUNDS FOR THE PRODUCTION OF CALCINED PRODUCTS

(71) Applicant: Calix Ltd, Pyrmont, NSW (AU)

(72) Inventor: Mark Sceats, Pyrmont (AU)

(73) Assignee: Calix Ltd, Pymble (AU)

( * ) Notice: Subject to any disclaimer, the term of this patent is extended or adjusted under 35 U.S.C. 154(b) by 0 days.

(21) Appl. No.: 15/527,478

(22) PCT Filed: Nov. 11, 2015

(86) PCT No.: PCT/AU2015/000684
§ 371 (c)(1),
(2) Date: May 17, 2017

(87) PCT Pub. No.: WO2016/077863
PCT Pub. Date: May 26, 2016

(65) Prior Publication Data
US 2017/0320774 A1    Nov. 9, 2017

(30) Foreign Application Priority Data

Nov. 18, 2014   (AU) ................ 2014904634

(51) Int. Cl.
*C04B 2/10* (2006.01)
*B01J 6/00* (2006.01)
(Continued)

(52) U.S. Cl.
CPC ............. *C04B 2/106* (2013.01); *B01J 6/004* (2013.01); *B01J 27/232* (2013.01); *C01F 5/06* (2013.01);
(Continued)

(58) Field of Classification Search
CPC . C04B 2/106; C04B 2/10; C04B 2/102; C01F 5/06; C01F 5/08; B01J 6/004; B01J 27/232

See application file for complete search history.

(56) References Cited

U.S. PATENT DOCUMENTS

| 4,128,392 A | 12/1978 | Tock |
| 4,555,388 A | 11/1985 | Hundebol |

(Continued)

FOREIGN PATENT DOCUMENTS

| CA | 1062007 A1 | 9/1979 |
| CN | 102309917 | 1/2012 |

(Continued)

OTHER PUBLICATIONS

CN 104129931A Machine Translation (Year: 2014).*
(Continued)

*Primary Examiner* — James A Fiorito
(74) *Attorney, Agent, or Firm* — TraskBritt

(57) ABSTRACT

A process for producing a highly calcined and uniformly calcined product from a feedstock. The process comprising the steps of grinding the feedstock to powder, preheating the powder, and calcining the powder in a reactor plant that comprises a number of reactor segments in which a flash calciner is used in each progressive reactor segment to incrementally react the powder by raising the temperature in each segment. The last segment may be a high-temperature reactor that has a controlled residence time and temperature that may allow controlled finishing of the calcination process to achieve a desired degree of calcination and sintering of the product; and cooling of the product.

16 Claims, 2 Drawing Sheets

(51) Int. Cl.
  *C01F 5/08* (2006.01)
  *C01F 5/06* (2006.01)
  *B01J 27/232* (2006.01)

(52) U.S. Cl.
  CPC .................. *C01F 5/08* (2013.01); *C04B 2/10* (2013.01); *C04B 2/102* (2013.01); *Y02P 40/42* (2015.11)

(56) References Cited

U.S. PATENT DOCUMENTS

| | | | |
|---|---|---|---|
| 5,260,041 A | | 11/1993 | Cohen et al. |
| 8,807,993 B2 * | | 8/2014 | Sceats ................. B01J 6/004 432/18 |
| 2011/0011142 A1 * | | 1/2011 | Sceats ................. B01D 53/62 71/63 |

FOREIGN PATENT DOCUMENTS

| | | |
|---|---|---|
| CN | 103304157 A | 9/2013 |
| CN | 104129931 | 12/2015 |
| GB | 2076308 A | 12/1981 |
| WO | 2012145802 A2 | 11/2012 |

OTHER PUBLICATIONS

International Search Report from International Application No. PCT/AU2015/000684, dated Dec. 11, 2015, 4 pages.
International Written Opinion from International Application No. PCT/AU2015/000684, dated Dec. 11, 2015, 4 pages.
Flash Calciner Systems for Minerals, Brochure, One Source, Jul. 29, 2013, 4 pages, FL Smidth.
European Supplementary Search Report and Written Opinion for European Application No. 15860368, dated Jun. 5, 2018, 6 pages.
Chinese Search Report for Chinese Application No. 201580062367, dated Mar. 1, 2018, 2 pages.
Office Action received for European Patent Application No. 15860368, dated Dec. 10, 2018, 4 pages.
Chinese Search Report for Chinese Application No. 201500623679, dated Nov. 23, 2018, 1 page.
Australian Examination Report for Australian Application No. 2015349593, dated Nov. 23, 2018, 4 pages.
"Making Magnesium a More Cost and Environmentally Competitive Option," Douglas J. Zuliani and Douglas Reeson, Global Automotive Lightweight Materials Conference (Apr. 25-26, 2012).

* cited by examiner

PROCESS AND APPARATUS FOR MANUFACTURE OF CALCINED COMPOUNDS FOR THE PRODUCTION OF CALCINED PRODUCTS

CROSS-REFERENCE TO RELATED APPLICATIONS

This application is a national phase entry under 35 U.S.C. § 371 of International Patent Application PCT/AU2015/000684, filed Nov. 11, 2015, designating the United States of America and published in English as International Patent Publication WO 2016/077863 A1 on May 26, 2016, which claims the benefit under Article 8 of the Patent Cooperation Treaty to Australian Patent Application Serial No. 2014904634, filed Nov. 18, 2014.

TECHNICAL FIELD

The present application relates broadly to a process, system and apparatus for manufacture of calcined or partially calcined minerals. The present disclosure may have specific application for the manufacture or production of dolime for magnesium production, which is adapted to facilitate carbon capture; and for the general production of materials from calcination processes that require a high degree of specification of the degree of calcination and/or sintering.

BACKGROUND

Magnesium metal production can be produced either in an electrolytic process from magnesium chloride which is electrolyzed to form magnesium metal, or using a silicothermic reduction process to reduce the magnesium from dolime. The electrolytic process is costly to operate because of the power consumption, and has been replaced by the silicothermic process.

The silicothermic process has three stages. In the calcination stage, a dolomitic mineral $(MgCO_3)_x.(CaCO_3)_y.(Mg(OH)_2)_z$ is calcined to dolime $(MgO)_{x+z}(CaO)_y$. The mineral is a composite of brucite $(Mg(OH)_2)$, magnesite $(MgCO_3)$, and dolomite $(MgCO_3.CaCO_3)$, and may contain impurities such as silica and iron oxides. The composition of this input stream may be optimized for the process by blending minerals. This process produces significant, unavoidable, carbon dioxide $(CO_2)$ as well as steam $(H_2O)$. In the silicothermic stage, the dolime is ground and mixed with a reductant, usually ferrosilicon, to form a briquette to give contact between the dolime particles and the ferrosilicon, and the briquette is processed in a reactor at high temperature and low pressure to produce magnesium metal vapor and a slag of calcium silicate and iron. The magnesium metal vapor is condensed to a solid in the reactor, and cooled to form the solid metal in the reactor. The reactor is opened, and the magnesium crust removed and processed to an ingot in the third stage.

There are four industrial processes for the silicothermic stage, namely the Pidgeon™ process, the Balzano™ process, the Magnatherm™ process, and the Mintek™ process.

The Mintek™ process is a continuous process in which the feed materials are separately introduced into the furnace, whereas the other processes are batch processes in which the ground feed material is a briquette, which is formed by pressing the powders. The Pidgeon™ and Balzano™ processes are based on solid-state reactions at about 1100° C.-1200° C., whereas the Magnatherm™ and Mintek™ processes are liquid-phase reactions at 1550° C.-1750° C., and to achieve melting, these processes include the addition of aluminium oxide or aluminium. The Pidgeon™ process uses a stainless steel retort, which may be heated by electrical power or combustion, while the other processes use electrical heating. In the solid-state reactions, the briquetting process is essential for the solid-state processing. This process brings the reactants of dolime and ferrosilicon, each in powder form of less than 100 microns diameter, into close physical contact to allow the reactions to occur. Additives such as calcium chloride are used in the briquette to promote the fusion of the solids in the furnace. The condensation of magnesium to the solid takes place within a cooled segment of the furnace, which is typically run under vacuum to lower the operating temperature. A variation of these processes is to use rapid quenching of the magnesium vapor in a supersonic expansion to produce a solid powder.

These silicothermic processes use dolime as an input, and the requirements on the dolime inputs are all similar, principally a high degree of calcination. It would be appreciated by a person skilled in the art that any gaseous emissions from the silicothermic process will be deleterious because the process is generally a low-pressure process. Specifically, any residual carbon in the dolime will be calcined to $CO_2$ during the process, and the $CO_2$ may be reduced to carbon or carbon monoxide by the ferrosilicon. This consumes the ferrosilicon, and the carbon may condense with the magnesium. It is highly desirable that the carbon content of the dolime is as small as possible, typically less than 0.1%.

For the calcination stage, the current technology produces the dolime from crushed rocks in a kiln. In a kiln, the $CO_2$ from the carbonate calcination is mixed with the heating gas from combustion, such that the total amount of $CO_2$ arises from this process mixed the $CO_2$ from combustion. Typically, in a coal-fired, best practice kiln, 60% of the $CO_2$ emitted is from the carbonate calcination. This disclosure describes a process for production of the dolime in which the carbonate emissions are significantly reduced.

A common feature of all the magnesium production processes is their energy intensity and associated high carbon dioxide emissions. For example, the majority of the world's magnesium is now produced using the Pidgeon process in which the heat for the dolime furnace and the silicothermic process are produced from the gasification of coal. The Global Warming Potential (GWP) for magnesium has been reported as 43.3 kg of $CO_2$ per kg of magnesium metal, whereas the average GWP for aluminium ingot is 12.7 kg $CO_2$ per kg of Aluminium. The substitution of aluminium by magnesium is desirable because of the lower weight and higher strength of the metal. There is a need to reduce the $CO_2$ emissions from the production of magnesium to be as low as, or preferably lower than, that of aluminium so that the products have a comparable, or lower, carbon footprint.

The $CO_2$ emissions can be considerably reduced by the use of natural gas in the calcination stage, and by the use of hydroelectric power to electrically heat the furnace for the silicothermic process. It has been reported that the GWP can be used to lower the emissions to 9.1 kg $CO_2$ per kg Mg using these alternative sources of energy. If the natural gas is replaced by a biofuel, such as charcoal from natural products, the fossil fuel emissions can be further reduced. However, in all these processes, the process emissions from dolomite calcination are released to the atmosphere, and contribute to greenhouse warming.

A lifecycle analysis has been reported for the use of magnesium metals in automobiles. The model is based on the replacement of 318 kg of iron, steel and aluminium with 154 kg of magnesium metal in a standard automobile. The lower weight means a decrease in the $CO_2$ emissions from petrol consumption. The lifecycle analysis considers both the $CO_2$ emissions in the production of the metals, and the emissions from petrol combustion. The results are expressed in the number of kilometers that the automobile has to be driven to reach a breakeven point between the emissions savings from lower petrol consumption arising from the reduction in weight, and the increase in emissions from production of the magnesium compared to the metals they replace. The Pidgeon process using coal as the fuel gives a breakeven of distance of about 275,600 km, while the use of natural gas and hydropower reduces this to about 69,500 km. (See, "Making Magnesium a More Cost and Environmentally Competitive Option," Douglas J. Zuliani and Douglas Reeson, Global Automotive Lightweight Materials Conference (Apr. 25-26, 2012).) It follows that the capture of the process emissions would reduce this breakeven to about 12,500 km. This is a small fraction of the total distance travelled by a car during its lifetime, so that the environmental savings would be significant if the process $CO_2$ could be prevented from being emitted. There is a need to reduce the $CO_2$ emissions from the manufacture of magnesium in order to make lightweight metal vehicles that lead to a net reduction of emissions.

This disclosure primarily pertains to the reduction of emissions for the first stage of the silicothermic magnesium production process, namely, the production of dolime from dolomite in a calcination process. If hydroelectric power was used for the silicothermic process, and biomass for the calcination fuel, then magnesium metal could be produced with near zero emissions. Further, if hydroelectric power is also used for the calcination process, the magnesium metal may be produced with zero emissions or substantially zero emissions.

In one embodiment, the disclosure describes a means of direct separation of carbon dioxide from the calcination of the dolomite mineral by combustion of a fuel, such that the carbon dioxide is never mixed with any combustion gas flue and/or air, and does not have to be separated. This stream can be compressed, and sequestered to avoid the emissions. The avoidance of a flue gas capture process reduces the energy and expense of deploying such post-combustion capture processes. In another embodiment, electric power may also be used for the calcination of dolomite in $CO_2$ and/or steam. The primary disclosure described is the means of capture of the $CO_2$ gas from processing the dolomite to an oxide while maintaining the high degree of calcination of the dolomite required for the silicothermic process.

The preferred requirement is that that dolime should be processed to give a residual amount of bound $CO_2$ that is preferably less than 0.1% for magnesium metal production, and which is energy efficient in its own right so as to minimize the consumption of fuel.

Generally, the production of highly calcined products from crushed rocks or granules in kilns provides a wide variation in the degree of calcination of powders that arises from the fact that calcination occurs from the outside of the rocks inwards. To achieve a high degree of calcination, the residence time in the kiln is very long, in which case, the particles have a wide distribution of surface areas, hence reactivities because the sintering of the particles occurs after the reaction zone has progressed into the rocks or granules. The need for controlled sintering and calcination is difficult to achieve. In principle, the grinding of the powder and processing in a flash calciner can resolve these problems.

However, flash calciners that inject the particles into a hot combustion gas generally result in wide range of calcination and sintering because each particle experiences a different environment. The use of indirectly heated counterflow reactors produce materials that have a uniform processing, such that the surface area and degree of calcination can be controlled. However, the limited residence time is such that a high degree of calcination cannot be achieved. This disclosure provides a calcination process in which the degree of calcination and sintering can be controlled.

There are many processes in which the calcination process requires a specific gaseous environment, for example, where the oxidative/reduction potential of the reaction requires specific control of the gas composition. In this case, mixing of the solids with the heating gas cannot be deployed. There is a need for a calcination process in which a degree of calcination and sintering and gas environment can be controlled.

BRIEF SUMMARY

A first aspect of the present disclosure may include a method, system, process or device adapted for the production of dolime for magnesium metal production.

Preferably, the disclosure specifically provides improvements to processes and apparatus for magnesium metal manufacture that may overcome some or all of the above-described deficiencies of the conventional processes, including without limitation, facilitating carbon dioxide capture from the dolomite calcination stage, and producing dolime with a small residual amount of carbonate, which is suitable for use in the production of magnesium with a high thermal efficiency.

A first aspect of the present disclosure may include a process for producing dolime from dolomite including the steps of: crushing and grinding the dolomite to a powder with a composition $(MgCO_3)_x \cdot (CaCO_3)_y \cdot (Mg(OH)_2)_z$; and calcining the powder in a sequence of calcination stages that substantially capture the $CO_2$ to produce dolime $(MgO)_{x+z} \cdot (CaO)_{y-w} \cdot (CaCO_3)_w$ with a low residual carbon content w that meets the specifications for magnesium production. The sequence has a first calcination stage at low temperature in which the $CO_2$ from the $MgCO_3$ and the $H_2O$ from the $Mg(OH)_2$ are released into a gas stream of $H_2O$ and $CO_2$, to give a solid semidolime $(MgO)_{x+z} \cdot (CaCO_3)_y$; a second calcination stage at an intermediate temperature in which the $CO_2$ from the $CaCO_3$ is substantially released into a gas stream of $CO_2$ to give a partially calcined dolime $(MgO)_{x+z} \cdot (CaO)_{y-w} (CaCO_3)_w$; and a third stage at a high temperature to produce dolime $(MgO)_{x+z} \cdot (CaO)_{y-v} (CaCO_3)_v$, in which the residual carbon, v, in $CaCO_3$ is reduced to the specification required for magnesium production. Preferably, at least one of the first and the second calcination stages are indirectly heated, and more preferably, both of the first and the second calcination stages are indirectly heated.

In terms of carbon capture, the complexity of the third capture reactor may be simplified by allowing the small amount of $CO_2$, w−v, to be released. In this case, the relative amounts of carbonate carbon captured is x+y−w and the amount ultimately exhausted in the process is no larger than w. It is preferable that w/(x+y) is less than 5%, so that the process $CO_2$ emissions reduction in this aspect is at least 95%.

In a further embodiment using a combustion gas for the calciner heat, it may also be preferable such that the heat in the dolime, the $CO_2$ streams, the slag and the flue gas streams is extracted and used to preheat the dolime and the air, used in the combustion systems. Such heat recuperation measures may reduce the fuel consumption, and the $CO_2$ emissions from such fuels is therefore minimized, such that the overall carbon footprint for the production of magnesium metal is greatly reduced. For the embodiment using electric power for the calciner energy, it may also be preferable that the heat in the dolime, the $CO_2$ and the slag streams, is extracted and used to preheat the dolime. Such heat recuperation measures may reduce the fuel consumption, and the $CO_2$ emissions from such fuels is therefore minimized, such that the overall carbon footprint for the production of magnesium metal may be significantly reduced. In the case of the Mintek™ liquid process for magnesium production, the hot dolime powder can be introduced directly into the reactor, and the heat may be recovered from the silicothermic stage, to increase the thermal efficiency of the overall process of magnesium production.

Preferably, the final process gas stream, comprising carbon dioxide, may be cooled and compressed, and may be sequestered, or otherwise used to avoid or reduce emissions. Optionally, the cooled and compressed $CO_2$ may be stored.

In a second aspect of the disclosure, the $CO_2$ from the third calcination step may be captured as a pure gas stream, so that the emissions are no larger than $v/(x+y)$.

In a third aspect of the disclosure, the first two stages of the first or second aspects may be combined into a single stage. This aspect has no impact on the emissions when applied to either the first or second aspects.

In a fourth aspect, all three stages of the second aspect may be combined into a single stage. This aspect has no impact on the emissions when applied to the second aspect.

There is a benefit to processing in separate stages at different temperatures associated with the control of the process, and the cost and performance of the materials that can be used in the construction of the stages.

While magnesium metal is used as an example, there are other industrial processes, such as the production of refractories, catalyst supports from hydroxides, carbonates and other volatile materials that can benefit from sequential processing and the separation of the flue gases from the process gas stream. Other such processes include the processing of minerals in an inert or reducing atmosphere. In many such cases, the final high temperature process is a sintering process, or a solids reaction, that may take considerable time to complete. The third stage of the first aspect of this disclosure can be used for the high temperature processes, and the primary benefit is the control of the process derived from separating the initial processing steps associated with large gas emissions from the solid state reactions that require intimate contact between particles. This disclosure applies to such processes.

Preferably, the fossil fuel carbon emissions from the flue gas are reduced by using non-fossil fuels, such as fuels from biomass and waste, hydrogen, or using natural gas, which has a low carbon footprint. Also, the use of carbon capture processes such as oxyfuel, pre-combustion or post-combustion capture may be used to reduce the carbon emissions from the fuel.

A further aspect of the present disclosure may comprise a process for producing a highly calcined and uniformly calcined product from a feedstock including the steps of: grinding the feedstock to a powder; preheating the powder; and calcining the powder in a reactor plant that comprises a number of reactor segments in which a flash calciner is used in each progressive reactor segment to incrementally react the powder by raising the temperature in each segment. The last segment is a high-temperature reactor that has a controlled residence time and temperature that allows the controlled finishing of the calcination process to achieve the desired degree of calcination and sintering of the product; and cooling the product.

Preferably, the last reactor segment is a circulating fluidized bed reactor. The preferred circulating fluidized bed is directly heated by a heating gas, and the exhaust gas is separately treated from the exhaust gas of the indirectly heated reactors in the earlier segments.

The reactor segments may constructed, formed or mounted into a tower formation in which the reaction proceeds from the top to the bottom.

Preferably, reactor segments are indirectly heated reactors configured such that the temperature of the materials in the reactor may increase as the materials pass through the reactor.

Preferably, an inert gas, a reducing gas, or any specific gas is used to entrain the solids in the reactors without mixing with the flue gas. The powder may include an average diameter of equal to or less than 100 microns.

The preferred calcination process may result in the evolution of gases and the ducting off of these gases at the end of each reactor segment facilitates the progress of the reaction in subsequent segments.

Preferably, the gas streams are ducted upwards and combined such that the gas streams are progressively cooled by the downflowing reactants.

The feedstock may be a carbonate such as magnesite, dolomite or limestone minerals or mixtures thereof, which may also contain hydrated minerals, and may also be synthetic carbonate compounds, such that the carbon dioxide liberated in the indirectly heated reactor segments is not mixed with the flue gas, so as to enable carbon capture.

The feedstock may also be is a dolomitic magnesite mineral of a composition, including hydrated compounds, suitable for the production of magnesium metal.

The feedstock may also have a composition suitable for the production of a porous substrate through the calcination of volatiles that may include hydrated water, carbon dioxide, ammonia and organic materials, in which it is desired to control the pore size distribution of the product through controlled sintering.

A further aspect of the present disclosure may comprise a device adapted for producing a highly calcined and uniformly calcined product from powdered feedstock, wherein the device comprises a chain of indirectly heated reactor segments having first and last reactor segments, wherein each reactor segment forms a flash calciner and wherein each reactor segment is adapted to be operated at a higher temperature than the previous reactor segment, and wherein the last reactor segment is adapted to include: a predetermined residence time for the processing of feedstock; and a predetermined temperature that is adapted to allow for the controlled finishing of the calcination process to achieve a desired degree of calcination and sintering of the product.

It would be appreciated by a person skilled in the art that the basis for the disclosure is a calcination process that can process the solids in a number of stages without mixing of the process gases with the heating gases.

Further forms of the disclosure will be apparent from the description and drawings, and from the claims.

BRIEF DESCRIPTION OF THE DRAWINGS

Embodiments of the disclosure will be better understood and readily apparent to one of ordinary skill in the art from the following description, by way of example only, and in conjunction with the drawings, in which.

DETAILED DESCRIPTION

A first preferred embodiment of the present disclosure is described is for the specific application for the production of dolime from dolomite for magnesium production using indirect heating from a combustion process. This calcined product may have a specification for the maximum carbon content that is allowable in the furnace that vaporizes the magnesium, and a desirable requirement that the product has as high a surface area as possible to optimize the solid-state reaction between the dolime and the ferrosilicon in the furnace. This is a specific example or embodiment of a general method in which the calcined product must meet requirements of both reactivity and calcination.

Figure 1:
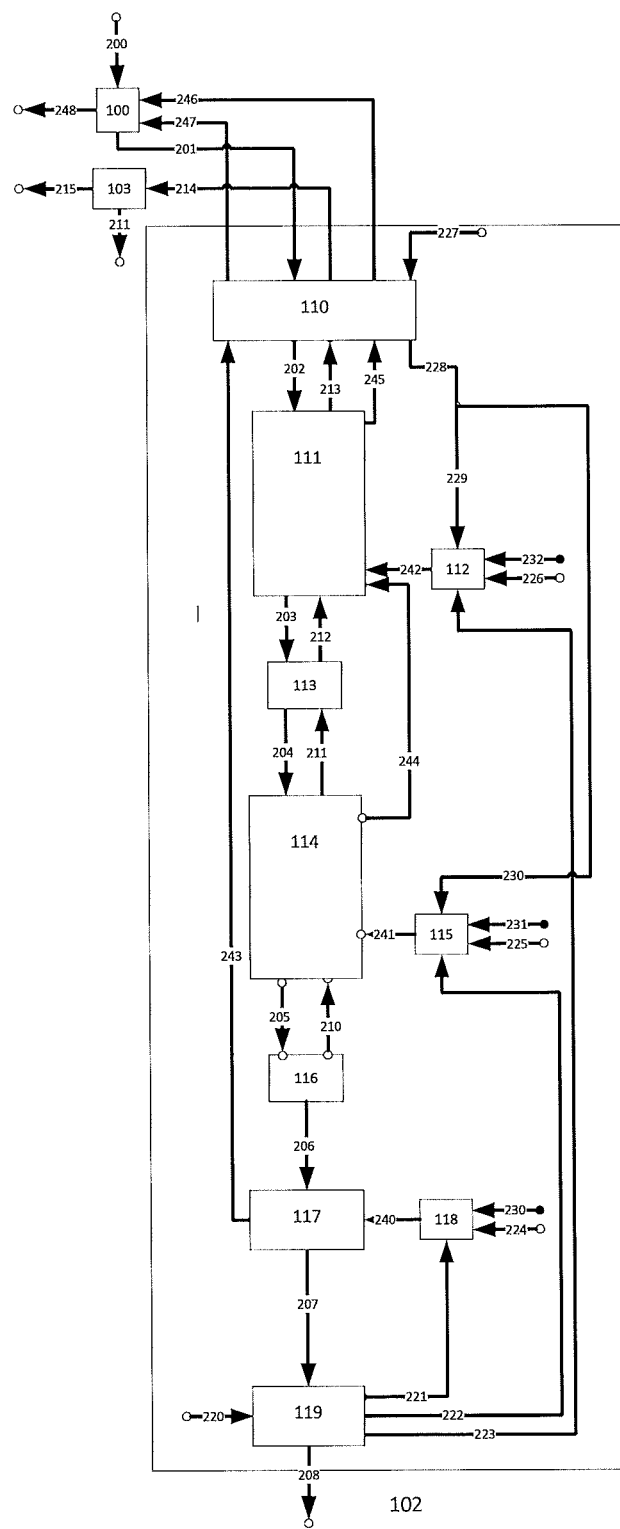
FIG. 1 shows a schematic drawing of a process for production of dolime and a relatively pure $CO_2$ stream from reactors according to a first embodiment.

The dolime production process can be described by consideration of the process flow of FIG. 1. In this embodiment, that carbonate is dolomite with an appropriate magnesium to calcium ratio to optimize the production of magnesium metal using ferrosilicon. Such a feedstock may include brucite, $Mg(OH)_2$, and mixtures of pure dolomite $MgCO_3.CaCO_3$ and magnesite $MgCO_3$, to achieve the desired ratio. The described process may be adapted to a device, method or system to achieve the same or similar outcomes or results.

A suitable pre-heater and flash calciner reactor is of the type as described by Dr. Mark Sceats in published PCT Patent Application No. WO 2012/145802, which is incorporated herein by reference, may be suitable for an embodiment that uses combustion to supply the calcination energy. In that reactor, the separation of the heating gas from the calcination process gas this is achieved using indirect heating from the heating gas. This may be achieved using a metal or ceramic wall between the two flows. The heating gas and the process streams are in counterflow, such that such that the energy efficiency is high, in the same way that counterflow heat exchangers have a high energy efficiency. The solids fall under gravity and are entrained by the process gas steam, while the heating gas rises. The products have a high surface area because the residence time of the mineral is short to achieve the preferable counterflow.

Figure 2:
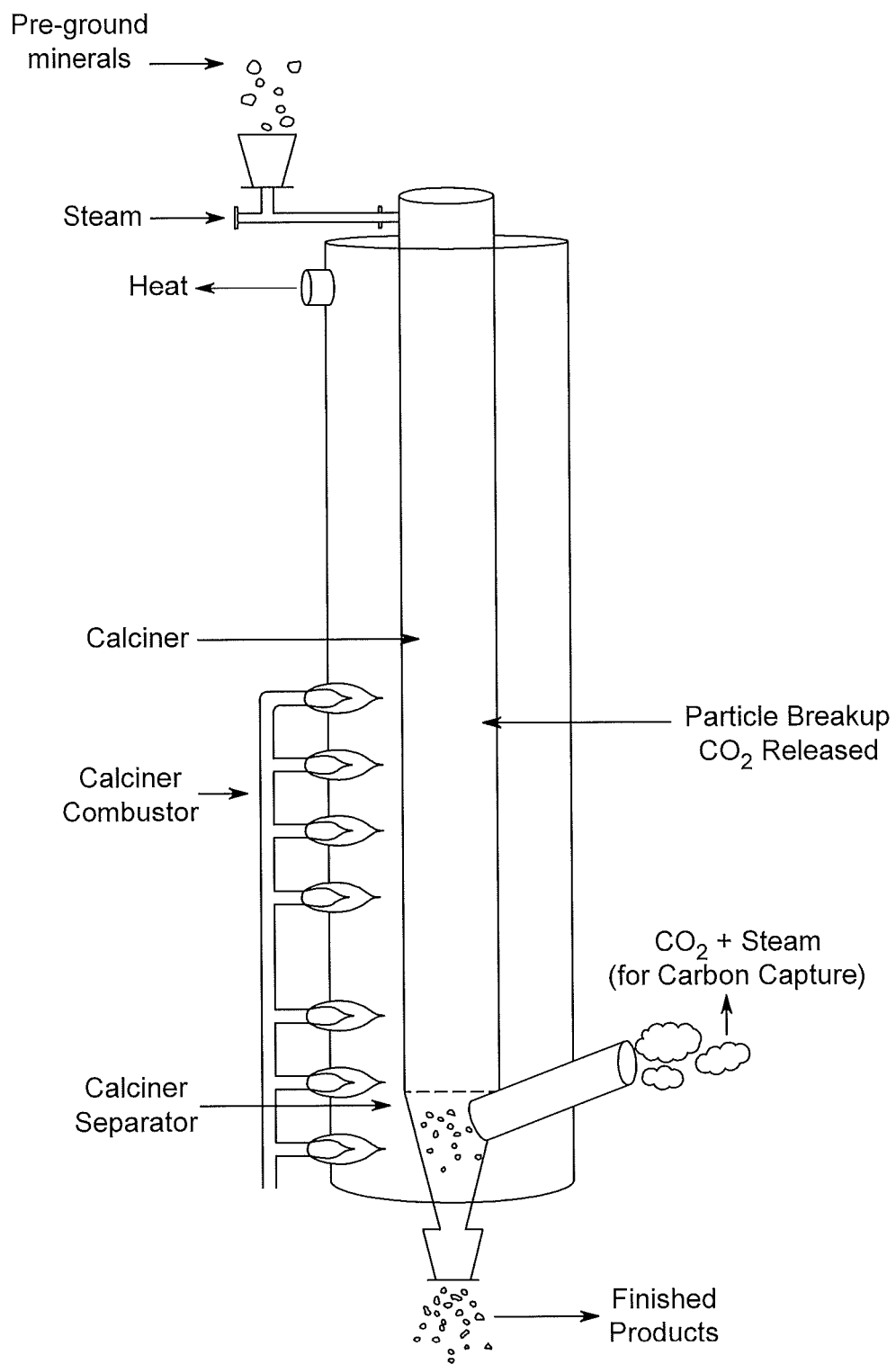
FIG. 2 illustrates an embodiment of the flash calciner reactor of FIG. 1.

The residence time in the reactor of FIG. 2 of the above-mentioned document is determined by the entrainment of the solids in the gas, and the large amounts of $CO_2$ produced in the reactor is such that the residence time cannot be readily increased in this reactor. In practice, the short residence time in this reactor is such that the residual amount of $CO_2$ in the calcined product is in the range of 2%-5%. This product does not meet the specification for use in the production of magnesium.

In this first preferred embodiment and as depicted in FIG. 1, the reactor comprises three reactor segments, in which the low and intermediate temperature segments are based on indirect counterflow processing, and the high temperature "polishing" reactor is a conventional direct mixing reactor typical of conventional flash calciners. The use of two indirect counter flow reactors is to increase the residence time of the solids, because the $CO_2$ is released in two separate processes. The low temperature process is the calcination of magnesium hydroxide and magnesium carbonate, in magnesite or dolomite, which occurs in the range of below 750° C., while the intermediate temperature process is the calcination of the calcium carbonate, which occurs in the range of 800° C.-900° C. If the $CO_2$ from the calcination of magnesium is not removed, the partial pressure of $CO_2$ is sufficiently high that the reaction of the calcium site does not take place until the temperature of the heated solids is such that equilibrium partial pressure exceeds the $CO_2$ pressure, namely about 900° C. The release of $CO_2$ then occurs rapidly and the process becomes difficult to control. Most importantly, the combination of the two $CO_2$ gas streams is such that entrainment of the solids by the gas is such that the residence time of the solids is low.

In this embodiment, the plant for the production of the dolime for magnesium production comprises a crushing and grinding plant 100 which is adapted to grind feedstock into a powder, a calciner tower 102 and a $CO_2$ processing plant 103. The calciner tower 102 is a structure that comprises a preheater reactor segment 110 in which the powder is preheated and the brucite $Mg(OH)_2$ is calcined to MgO; a low temperature flash calciner 111 using indirect heating from a heating gas produced in the first combustor 112 in which the magnesium carbonate, as the mineral component magnesite $MgCO_3$ and the dolomite $MgCO_3.CaCO_3$, is calcined to magnesia MgO; a first solids gas separator 113 in which the partially processed powder is separated from the $CO_2$ and steam; an intermediate temperature flash calciner 114 using indirect heating from a second combustor 115 in which the powder is processed such that any residual carbonate from the magnesium carbonate is calcined and the calcination of the calcium carbonate from the dolomite is substantially complete; a second solids gas separator 116 in which the substantially calcined power is separated from the $CO_2$; a high temperature flash calciner 114 using direct heating from a third combustor 118 in which the degree of calcination of the powder is reduced to the specification required by control of the temperature and residence time; and a solids cooler 119 in which the product is cooled for storage and, for briquette production.

The raw dolomite rock 200 is crushed and ground in the crushing and grinding plant 100. In this plant 100, moisture (not shown in FIG. 1) is removed by using the flue gas streams 246 and 247 from the calciner tower 102. The exhaust 248 from the plant 100 is fed into a filter (not shown) to remove fines and is exhausted in stack or calcine tower 102. The dolomite is ground to particles, preferably, of less than 100 microns diameter and, more preferably, to less than 50 microns diameter. The ground, substantially dry dolomite 201 is transported to the calciner tower 102 where it is processed to dolime.

In this process, the dolomite 201 is heated in a preheater segment 110 to a temperature of about 600° C., which marks the onset of the calcination reaction that removes $CO_2$ from the magnesium carbonate, $MgCO_3$ sites in the mineral powder. During pre-heating, steam is liberated from any excess moisture from brucite, $Mg(OH)_2$ in the mineral powder. The steam entrains with the powder in the preheater 110. Stream 202 comprises the partly processed mineral $(MgCO_3)_x.(CaCO_3)_y.(MgO)_z$. and the steam. The details of the preheater segment 110 are described below. The stream 202 heated intermediate is injected into the flash calciner segment 111. This flash calciner 111 uses indirect heating to ensure that the carbon dioxide liberated during calcination does not mix with the heating gases used to provide the energy of the reaction. A suitable flash calciner is of the type described by Sceats, for example, in published PCT Patent Application No. WO 2012/145802, incorporated herein by reference. A schematic illustration of an example flash calciner reactor is illustrated in FIG. 2 hereof. As the powder and gas in stream 202 falls through the reactor 117, they are heated in the range of 650° C.-750° C. by the heating gas streams 242 and 244, externally applied. At this temperature, the decarbonation of the magnesium occurs to give an exhaust stream 203 comprising the intermediate processed powder semidolime $(MgO)_{x+z}.(CaCO_3)_y$, and a gas of $CO_2$ and steam. The calcination of the magnesium is substantially complete. The stream 203 enters the first solids gas separator 113, in which the solids 204 are separated and flow into an intermediate temperature flash calciner 114. The gas stream is exhausted into a central tube (not shown in FIG. 1) that transports the gas to an exhaust at the top of the reactor as stream 213 and is cooled in the preheater 110. This stream also contains the $CO_2$ stream from the intermediate temperature flash calciner 114 described below. The cooled $CO_2$ stream 214 from the preheater 110 is fed into the $CO_2$ Processing plant 103 where it is dewatered, with a stream of water 211, compressed or liquefied for sequestration as 215. The partially hot semidolime stream 203 is substantially completely calcined in the intermediate flash calciner 114 by a heating gas stream 241, externally provided. A process steam 205 contains the calcined powder and the $CO_2$, and this steam and these are separated in the second solid gas separator 116 to give a substantially calcined dolime stream 206 and a $CO_2$ stream 210. The $CO_2$ stream 210 is exhausted into a central tube and is exhausted as stream 211. The powder 206 is $(MgO)_{x+z}.(CaO)_{y-v}.(CaCO_3)_v$, with $v \ll y$, and is metered into the high-temperature flash calciner 114, which is directly heated by heating gas 240 from the third combustor 118. In reactor 117, the excess carbonate is reduced from v to w to give $(MgO)_{x+z}.(CaO)_{y-w}.(CaCO_3)_w$, where w is sufficiently low that the product 207 meets the specifications. The v–w $CO_2$ is mixed with the heating gas as stream 243, and is cooled in the preheater 110 to give stream 244 which is used to dry the ground dolomite. The design of this reactor 117 is a fluidized bed in which the temperature of the product and the exhaust gas can exceed 1200° C. The residence time and temperature are controlled such that the desired degree of residual carbonate w is obtained. The mass flow of heating gas 240 is relatively small compared to those from the other combustors because the energy required to calcine the residual $CaCO_3$ is small. This stream (heating gas 240) may be a slip stream from the other combustors. The hot calcined product 207 is cooled in the solids cooler 119, and this product is provided to the briquetting plant. Briquetting must be conducted in an inert gas to prevent recarbonation from $CO_2$ in the atmosphere.

The combustors 112, 115, 118 use cold, sub-stoichiometric primary air streams 224, 225 and 226 to transport the fuels 230, 231 and 232 into the combustors, where they are combusted with preheated air streams from the preheater 110 and solids cooler segments (not shown). The preheater 110 heats the air stream 227, and the heated air is split as streams 228 and 229 to the first and second combustors 112 and 115, respectively. The solids cooler (not shown) provides heat to air stream 220 for the provision of heated air in streams 221 and 222 for the third and second combustors 118 and 115, respectively.

The preferred design of the preheater 110 and solids cooler are based on the following principles. Firstly, flows that are dominantly powders are restricted to vertical pipes that have diameters that are wide enough to prevent blocking, namely about 100 mm or more and the flow is downwards. There is an array of such pipes to manage the flows, and the flows are such that the powders are entrained in gas in a dilute flow. Where appropriate, steam is used to promote such flows. In this embodiment, in the preheater 110, the solid flow is the feed 201, and in the solids cooler 119, the solids flow is the product 207. Secondly, gas streams that contain minor amounts of process flow solids are also ducted through pipes, and in this embodiment such flows are upwards and forced by the gas streams. In this embodiment, in the preheater 110, the flows that contain some powders are the streams 243 and 213. It is preferable that these streams carry as small as possible solids, and where practical, there may be cyclones, including in-line cyclones, (not shown) that remove a large proportion of the solids and direct that flow back into the solids streams. Third, pure gas streams, such as air or heating gas are directed through the systems in a cross-flow pattern through horizontal ducts with a duct width chosen to give a gas velocity that is sufficiently high to achieve efficient heat transfer to or from the pipe walls. The gas streams move from one horizontal duct to another through shafts. In the solids cooler 119, the ducted gas stream is the air 220, and in the preheater 110 the ducted gases are the air 227 and the heating gas 245. Fourth, the heat flows are such that the ducted streams of gases are injected into the segments such that the vertical flow is a counterflow to the solids flows. Thus, in the preheater 110, the top of the preheater 110 is colder than the base, so the cool streams, as inputs or outputs are at the top and all the hot streams are at the base. Thus, streams 227 (in), 201 (in), 214 (out) and 247 (out) are at the top, and are cooler than the respective streams 228 (out), 202 (out), 213 (in) and 243 (in) at the base. In the solids cooler 119, the hot streams 207 (in), 221 (out), 222 (out), and 223 (out) are at the top, while the cool streams 208 (out) and 220 (in) are at the base. Using these principles, these segments may have a high thermal efficiency, and are compact.

The preferred design of the flash calciners 111 and 114 are such that the $CO_2$ streams from the respective gas solids separators 113 and 116 are ducted back through the reactors in a central tube. This aspect is a preferred embodiment in WO 2012/145802, and allows the reactors to be compact. The flows in that central tube are preferably in a vortex motion induced by the shape and orientation of the pipes in the preheater 110, and by deflector plates of the streams 203 and 205 entering the gas solids separators 113 and 116. This motion deflects the particles onto the wall of the central tube, and the particles flow down the walls into the gas solids separators 113 and 116. In effect, the tube is part of the design for the gas solids separators 113 and 116. The walls of the central tube shown in FIG. 2 are heated by the radiation from the reactor tube walls and the $CO_2$ gas streams, and this assists the efficiency of the calcination processes in the reactor annuli.

The sequence of the three reactors enables the product to meet the desired specifications of the product degree of calcination. The amount of $CO_2$ that is captured in the first reactor represents about 50% of the total carbon input, the amount of $CO_2$ that is captured in the second reactor amounts to about 45%, and the amount of $CO_2$ that is discharged into the flue gas is about 5%. In this case, the capture efficiency of the system is 95%. The control of the residence time and temperature in the third reactor is important because the calcined particles rapidly sinter at high temperatures, and the consequential reduction of the surface area lowers the reactivity of the particles. In the case of magnesium production, on the one hand, the extent of sintering lowers the reaction rate with the ferrosilicon in the heated briquette, and on the other hand, the longer the sintering, the greater the degree of calcination, and the less carbon is introduced into the magnesium reactors. It would be appreciated by a person skilled in the art that the calcination of dolomite rocks is difficult to control because the inner part of the rocks calcine more slowly that the outer parts. Generally, when ground there is a wide distribution of the degree of calcination of the product. To achieve the specifications for the dolime, a large fraction of the particles from the outer parts of the rock have been "overcooked" and are highly sintered and unreactive. This overcooking leads to longer residence times, and that creates an energy penalty. The wide range of the reactivity of the dolime in the ferrosilicon process also leads to longer processing times, and inefficiencies. This disclosure optimizes the production process efficiency, as well as captures the $CO_2$.

Yet a further embodiment may use electrical power to heat a furnace to provide the energy for calcination. The energy for calcination may be produced, using, for example, resistive heating. In this embodiment, the furnace wiring is segmented to provide control of the heat transfer to the products such that the temperature profile of the solids passing down through the calciner is one in which, preferably, increases monotonically. Otherwise, the process is as described in the first embodiment.

While particular embodiments of this disclosure have been described, it will be evident to those skilled in the art that the present disclosure may be embodied in other specific forms without departing from the essential characteristics thereof. The present embodiments and examples are therefore to be considered in all respects as illustrative and not restrictive, the scope of the invention being indicated by the appended claims rather than the foregoing description, and all changes which come within the meaning and range of equivalency of the claims are therefore intended to be embraced therein. It will further be understood that any reference herein to known prior art does not, unless the contrary indication appears, constitute an admission that such prior art is commonly known by those skilled in the art to which the invention relates.

The invention claimed is:

1. A process for producing a calcined product from a feedstock, the process comprising:
   grinding the feedstock to a powder;
   preheating the powder;
   calcining the powder in a reactor plant that comprises a plurality of reactor segments each comprising a flash calciner to incrementally react the powder in a calcination process by raising the temperature in each segment, wherein the feedstock comprises a carbon-containing compound, and wherein the plurality of reactor segments is indirectly heated such that carbon dioxide liberated in the indirectly heated plurality of reactor segments is not mixed with flue gas, so as to enable carbon capture;
   wherein a final reactor segment is a high-temperature reactor having a controlled residence time and temperature to allow controlled finishing of the calcination process to achieve a selected degree of calcination and sintering of the product; and
   cooling the product.

2. The process of claim 1, wherein the final reactor segment comprises a circulating fluidized bed reactor.

3. The process of claim 2, wherein the circulating fluidized bed reactor is directly heated by a heating gas, and an exhaust gas of the circulating fluidized bed is separately treated from exhaust gases of reactors in the earlier reactor segments.

4. The process of claim 1, wherein the plurality of reactor segments comprises at least one intermediate reactor segment externally heated using a gas stream derived from a combustion process.

5. The process of claim 1, wherein the reactor segments are electrically powered.

6. The process of claim 1, wherein the reactor segments are positioned in a tower configuration in which the calcination process proceeds from the top to the bottom.

7. The process of claim 1, wherein at least one gas selected from the group consisting of an inert gas and a reducing gas is used to entrain solids in the reactor plant without mixing with a flue gas.

8. The process of claim 1, wherein grinding the feedstock to a powder comprises forming a powder having a diameter of less than or equal to 100 microns.

9. The process of claim 1, wherein the calcination process results in evolution of gases and further comprising removing at least a portion of the gases at an end of each reactor segment to facilitate progress of the calcination process in subsequent segments.

10. The process of claim 9, wherein the gases removed at the end of reactor segment are ducted upward and combined such that that the gases are progressively cooled by down-flowing reactants.

11. The process of claim 1, wherein the feedstock is a carbonate selected from the group consisting of magnesite, dolomite, and limestone minerals and mixtures thereof.

12. The process of claim 11, wherein the feedstock is a dolomitic magnesite mineral of a composition suitable for production of magnesium metal or refractory materials.

13. The process of claim 1, further comprising producing a porous catalyst substrate by calcination of volatiles to control a pore size distribution of the porous catalyst substrate through controlled sintering.

14. The process of claim 11, wherein the feedstock comprises at least one hydrated mineral.

15. The process of claim 14, wherein the at least one hydrated mineral comprises a synthetic carbonate compound.

16. The process of claim 13, wherein the volatiles comprise at least one material selected from the group consisting of hydrated water, carbon dioxide, ammonia and organic materials.

* * * * *